United States Patent
Eltawil et al.

(10) Patent No.: US 11,992,003 B1
(45) Date of Patent: May 28, 2024

(54) PNEUMATIC SPRAYER FOR PALM TREES

(71) Applicant: KING FAISAL UNIVERSITY, Al-Ahsa (SA)

(72) Inventors: Mohamed Abdelaziz Mohamed Eltawil, Al-Ahsa (SA); Hasan Elsayed Ahmed Alhashem, Al-Ahsa (SA); Abdulrahman Othman Alghannam, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/173,565

(22) Filed: Feb. 23, 2023

(51) Int. Cl.
A01M 7/00 (2006.01)

(52) U.S. Cl.
CPC ........ *A01M 7/0039* (2013.01); *A01M 7/0085* (2013.01); *A01M 7/0089* (2013.01)

(58) Field of Classification Search
CPC .............. A01M 7/0035; A01M 7/0032; A01M 7/0039; B05B 7/0093; B05B 9/007
See application file for complete search history.

(56) References Cited

U.S. PATENT DOCUMENTS

| | | | |
|---|---|---|---|
| 2008/0048049 A1 | 2/2008 | Adams et al. | |
| 2016/0221032 A1 | 8/2016 | Whiting et al. | |
| 2021/0015059 A1 | 1/2021 | Alravvi et al. | |
| 2021/0299692 A1 | 9/2021 | Van De Woestyne | |
| 2022/0117215 A1* | 4/2022 | Sibley | A01M 7/0039 |
| 2022/0264864 A1 | 8/2022 | Sandey et al. | |

FOREIGN PATENT DOCUMENTS

| | | | | |
|---|---|---|---|---|
| CN | 108812596 A | * | 11/2018 | |
| CN | 109511634 A | * | 3/2019 | ......... A01M 7/0014 |
| CN | 109511634 A | | 3/2019 | |
| CN | 109526917 A | * | 3/2019 | |
| CN | 110326417 A | | 10/2019 | |
| CN | 209768694 U | | 12/2019 | |
| CN | 21069563 U | | 6/2020 | |
| CN | 111887235 A | * | 11/2020 | |
| CN | 214262390 U | | 9/2021 | |
| CN | 115251027 A | * | 11/2022 | |
| EP | 2957346 A1 | | 7/2019 | |

OTHER PUBLICATIONS

Ozkan, "Best Practices for Effective and Efficient Pesticide Application", Agriculture and Natural Resources (2020), 16 pages.

Sumner et al., "Assessing the Effectiveness of Air-assisted and Hydraulic Sprayers in Cotton Via Leaf Bioassay", The Journal of Cotton Science (2000), vol. 4, pp. 79-83.

* cited by examiner

*Primary Examiner* — Qingzhang Zhou
(74) *Attorney, Agent, or Firm* — Nath, Goldberg & Meyer; Richard C. Litman

(57) ABSTRACT

The pneumatic sprayer for palm trees includes an air tank having an outlet; a one-way air valve having an input port and output port, the outlet of the air tank being connected to the input port of the one-way air valve; a compressor connected to the one-way air valve; a pressure regulator connected to the air tank regulating the pressure of the air coming from the outlet of the air tank; an outlet tank connected to the output port of the one-way air valve; and a sprayer device connected to the outlet tank.

18 Claims, 3 Drawing Sheets

PNEUMATIC SPRAYER FOR PALM TREES

BACKGROUND

1. Field

The present disclosure relates to pneumatic sprayers, and particularly to a pneumatic sprayer for palm trees that may be used for pollination and pesticide spraying.

2. Description of the Related Art

Tractor-mounted sprinklers are often used to spray pesticides and herbicides, which are usually liquid-based solutions. Problems arise when more viscous solutions are used, such as viscous pesticides or in such applications as pollination. The range of spraying using sprinklers mounted on a tractor is not far and is many times used to spray weeds. In many instances the range is only 2 meters, which is not sufficient for such applications as spraying palm trees. Thus, a pneumatic sprayer for palm trees solving the aforementioned problems is desired.

SUMMARY

The present disclosure describes a pneumatic sprayer that has a long range and can be easily directed in multiple directions. It can be used in such applications as pollination and the use of viscous pesticides and herbicides on palm trees and other types of trees, plants and vegetation.

A pneumatic sprayer for palm trees includes an air tank having an outlet; a non-return or one-way valve having an input port and an output port, the outlet of the air tank being connected to the input port of the non-return valve; a compressor connected to the non-return valve; a pressure regulator connected to the air tank that regulates the pressure of the air coming from the outlet of the air tank; an outlet tank connected to the output port of the non-return valve; and a sprayer device connected to the outlet tank. It should be noted that using the air tank separated from the liquid tank achieves stable and high pressure.

The sprayer has a DC compressor for compressing air into the air tank and a digital air pressure regulator for regulating air pressure. There are two air pressure systems, one for compressing the liquid (pesticide) and the other for operating the spray gun with specific doses. The pressure regulator is adjustable up to a pressure of 10 bar and can further include a spray gun pressure regulator that is adjustable up to a pressure of 2 bar. The pneumatic sprayer can further include a stirring system having a shaft that extends into the outlet tank, blades extending from the shaft within the outlet tank, and a DC motor that drives the shaft. The device has many electronic circuits, and thus the possibility of automatic operation or manual control.

The spray device may include a spray gun having a controller to adjust the pressure of discharges from the spray gun.

A system for spraying pesticides or spraying for pollination includes a carrier car or trolley; an air tank mounted on the carrier car and having an outlet; a non-return valve having an input port and output port, the outlet of the air tank being connected to the input port of the non-return valve; a compressor connected to the non-return valve; a pressure regulator connected to the air tank that regulates the pressure of the air coming from the outlet of the air tank; an outlet tank mounted on the carrier car and connected to the output port of the non-return valve; and a sprayer device connected to the outlet tank. The exit of the pesticide is at the bottom of the tank, which is the same as the entrance of the pesticide when feeding the initial pesticide to the machine, and this leads to the exit of the entire amount of pesticide from the tank, which reduces maintenance work.

The system can further include a PV system (PV module, charge controller, battery) that supplies power to operate the system. The PV module can be a 100W PV module. The compressor can be a DC air compressor with natural magnetic poles, which greatly saves energy. The electronic pressure regulator is adjustable up to a pressure of 10 bar. The system can further include a spray gun having a spray gun mechanical pressure regulator that is adjustable up to a pressure of 2 bar. The outlet tank can further include a stirring system having a shaft extending into the outlet tank, blades extending from the shaft within the outlet tank, and a DC motor that drives the shaft at 100 rpm. The device has an electronic timer to control the stirring time according to what is required to prevent pesticide sedimentation. Also, the timer is used to delay the start of the stirrer for a specific time after the compressor starts work.

A method for spraying pesticides or spraying for pollination includes setting a pressure for a sprayer device through a pressure regulator and a compressor connected to a non-return valve, air from the air tank being supplied to an outlet tank through the non-return valve; aiming the spray device connected to the outlet tank containing a substance to be dispersed from the sprayer device; and dispersing the substance through the sprayer device. The device can be used to spray viscous pesticide in the form of specific, intermittent, and not continuous doses, and the pesticide doses can be directed to the place to be sprayed using a laser beam. The device has a gun to spray the liquid pesticide continuously when pressing the operating button.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The pneumatic sprayer for palm trees is a powerful pneumatic sprayer for spraying liquid, pesticides, herbicides, trees, plants, vegetation, and which may be used for pollination. The pneumatic sprayer for palm trees has enough power to spray a large range of trees, plants and other types of vegetation, either with a very soluble liquid or with a viscous composition.

Figure 1:
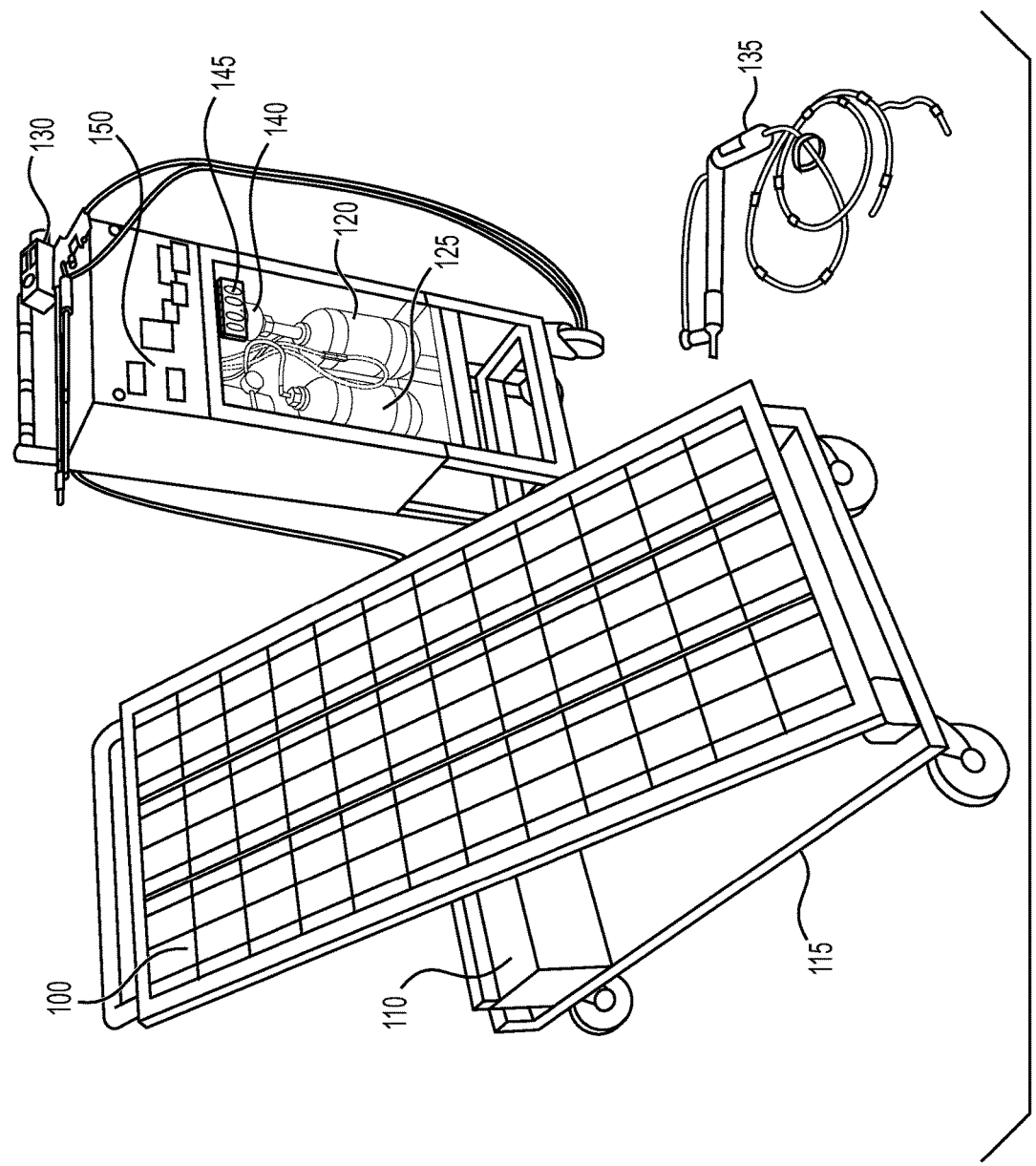
FIG. 1 is a perspective view of a pneumatic sprayer for palm trees system or kit.

FIG. 1 is a perspective view of the pneumatic sprayer, having a PV 100 (photovoltaic solar cell) and battery used as a power source and mounted on a trolley 115. The sprayer further includes an air tank 120 and an outlet tank 125 that contains a substance to be sprayed, such as a liquid, pesticide, herbicide, etc., or to be used for pollination. In some instances, the substance to be sprayed is a viscous substance. Two types of sprayers are depicted in FIG. 1: a mini-gel gun 130 for spraying viscous substances, and a liquid spray gun 135. A stirring system 140 and a timer 145 are used for stirring liquid substances. A control panel 150 is used to control pressure and operating mode.

Figure 2:
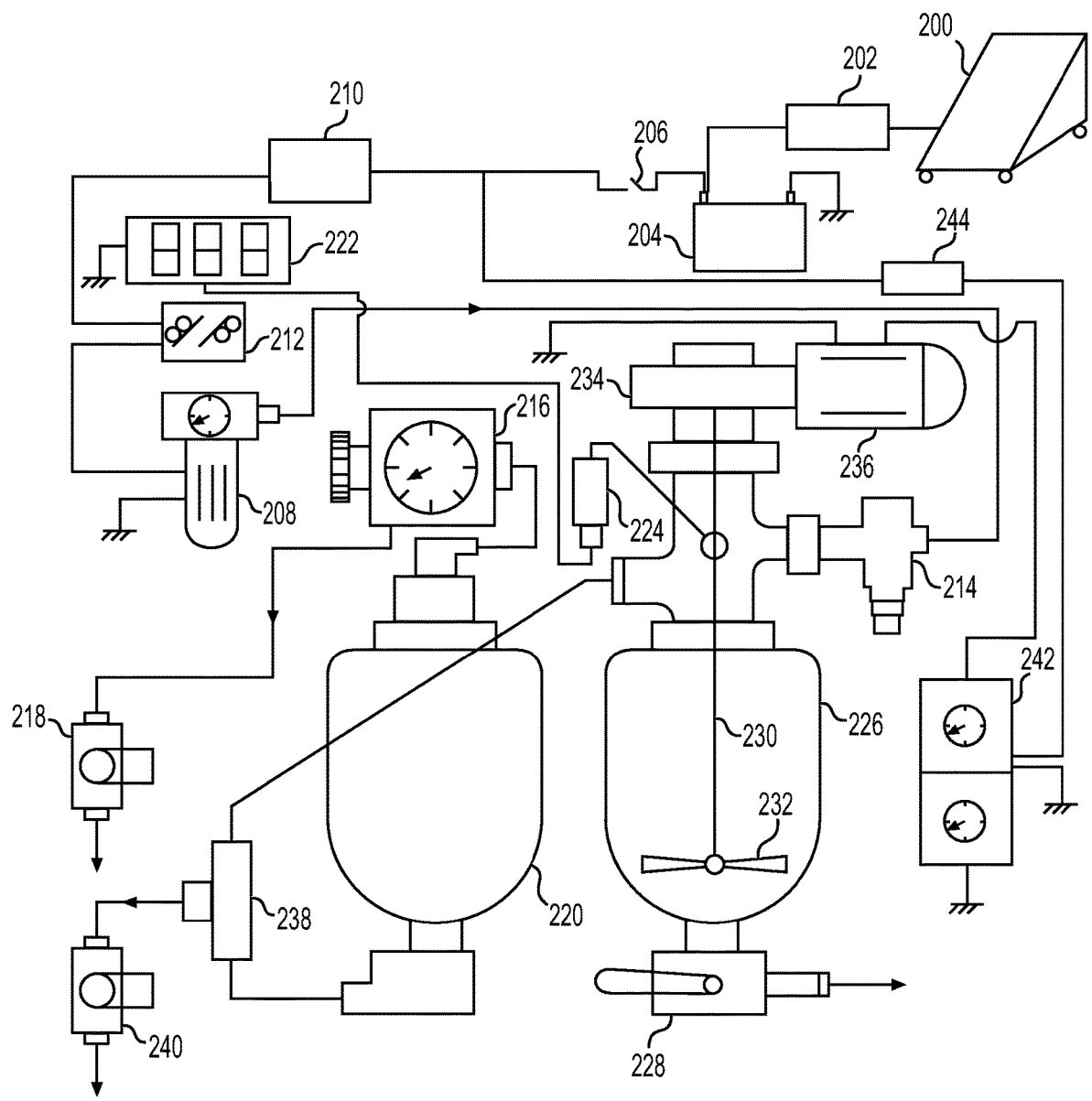
FIG. 2 is a schematic diagram of a pneumatic sprayer for palm trees.

FIG. 2 is a schematic diagram of the pneumatic sprayer that includes a PV panel 200 connected to a charge controller 202 that is connected to a battery 204. A power switch 206 is connected to the battery 204 and supplies power to the rest of the circuit.

A compressor 208 is connected to a compressor switch 210, a compressor relay 212, and a non-return or one-way air valve 214.

A mechanical pressure regulator 216 is connected to a gun air valve 218 and an air tank 220. An air pressure control panel 222 is connected to an air electronic pressure sensor 224, which is connected to the non-return or one-way valve 214.

The non-return or one-way valve 214 is connected to an outlet tank 226 that has an outlet valve 228 that can be connected to a spray gun.

A stirring shaft 230 having stirring blades 232 extends into the outlet tank 226. A gear box 234 is powered by a stirring DC motor 236 and drives the stirring shaft 230.

An air co-junction 238 is connected to the air tank 220 and the non-return valve 214 and outputs to an exit or pressure relief valve 240 for air pressure balance.

A timer 242 is connected to the power switch 206 through a timer switch 244.

The pneumatic sprayer illustrated in FIG. 2 is powered by a PV panel 200, although any other appropriate power source may be used. Power to the sprayer is supplied once the power switch 206 is engaged.

Air from the air tank 220 is supplied to the outlet tank 226. The pressure of the air being supplied is regulated using electronic pressure regulator 216 and the compressor 208. The pressure control panel 222 can be used to determine whether to adjust the air pressure in the air tank 220 up or down.

The contents of the outlet tank 226 are discharged by applying high pressure to the upper portion of the outlet tank 226. For example, if the outlet tank 226 is filled with a vicious pesticide, the compressor 208, in conjunction with the pressure regulator 216, maintains the required pressure above the viscous pesticide. The pressure above the viscous pesticide will force the viscous pesticide down through outlet valve 228. If the longitudinal distance of the discharged viscous pesticide is not sufficient, a simple pressure modification can increase the pressure and thereby increase the longitudinal distance. Pressures of up to 10 bar can be achieved in some embodiments.

The non-return or one-way valve 214 separates the air tank 220 and outlet tank 226 to maintain a constant pressure in the air tank 220 and prevents compressed air from returning to the compressor 208. The DC compressor 208 compensates the pressure with high accuracy via pressure regulator 224.

The contents of the outlet tank 226 need to be stirred in some instances. This may be to keep a good mixture of the contents or be to keep the contents at a certain consistency to give an even discharge. The stirring shaft 230 having stirring blades 232 extends into the outlet tank 226 for this purpose. The gear box 234 is connected to the stirring shaft 230. The stirring motor 236 drives the stirring shaft 230 through the gear box 234 and rotates the stirring blades 232 to stir the contents of the outlet tank 226.

Figure 3:
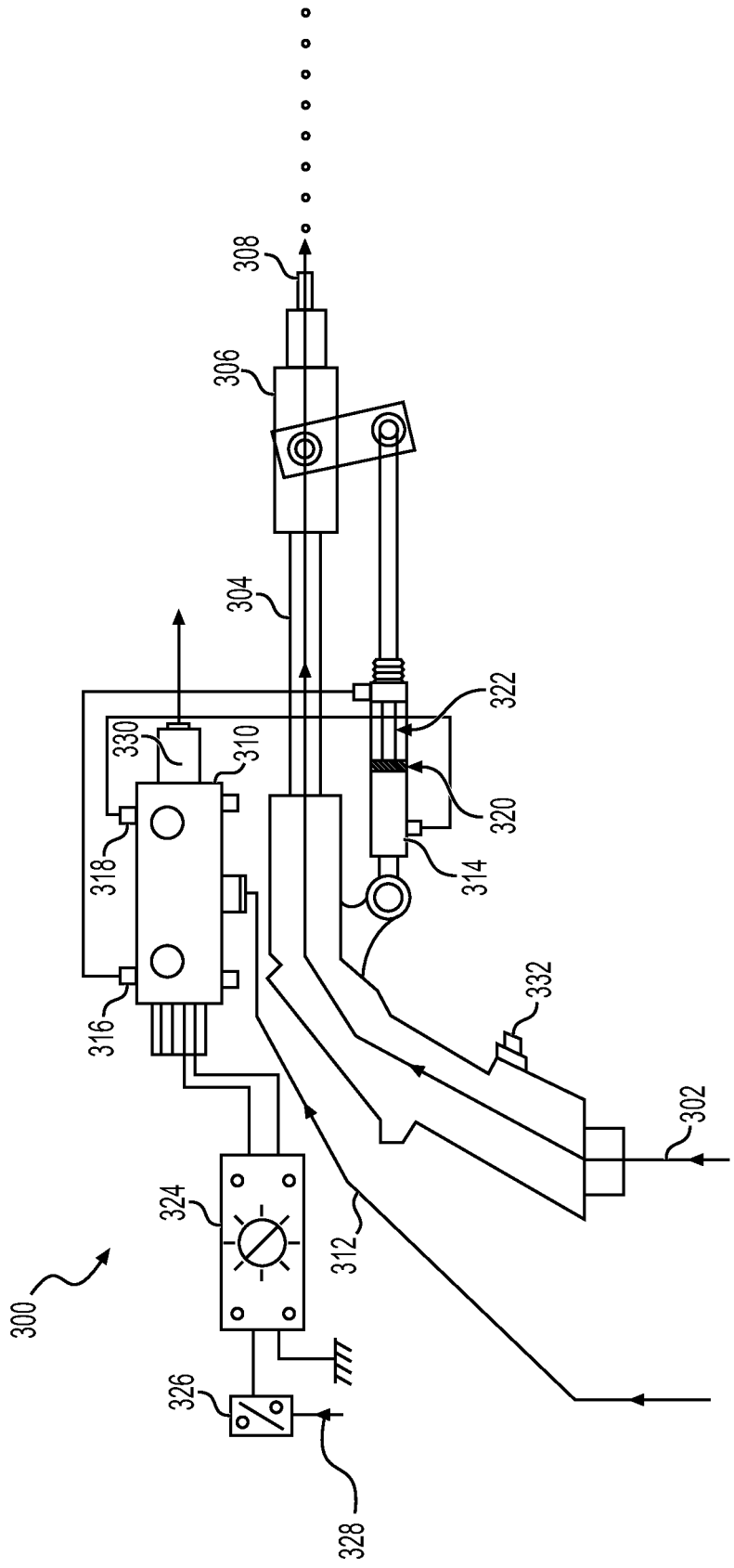
FIG. 3 is a schematic diagram of a mini-gel (viscous) spray gun for a pneumatic sprayer for palm trees.

FIG. 3 is a schematic diagram of a mini-gel (viscous) spray gun 300. The spray gun 300 includes a pesticide inlet 302 that leads to a barrel 304 connected to a stopcock 306 having a nozzle 308. The barrel 304, in one embodiment, is a copper tube having a diameter of eight millimeters, and the stopcock 306 is ¼ of an inch.

An air pentode 310 has an air inlet 312 and is connected to an air cylinder 314 via air valves 316 and 318. The air cylinder 314 includes a piston 320 connected to a shaft 322 that extends to the stopcock 306. The pentode 310 may be 12V DC and 4.7 W, is capable of handling pressures of up to 8 bar. The portion of the shaft 322 within the air cylinder 314 measures six millimeters and the piston 320 is sixteen millimeters.

A pesticide doses regulator 324 is connected to the air pentode 310 and to a gun power switch 326 that has a power input 328. A laser 330 is also attached to the air pentode 310. Finally, a trigger button 332 is located on the handle of the spray gun 300.

The pesticide inlet 302 of the spray gun 300 is connected to the outlet valve 228 of the outlet tank 226 depicted in FIG. 2. The gun air valve 218 is connected to an air inlet 312 of the air pentode 310. When the trigger button 332 is pressed, the pesticide from the outlet tank 226 is forced through the pesticide inlet 302 of the spray gun 300. The pesticide travels through the barrel 304 and is dispersed out the nozzle 308. The stream of pesticide exiting the nozzle 308 is controlled through the stopcock 306 by the air cylinder 314. The piston 320 moves forward and backward, which moves the shaft 322 forward and backward to adjust the stopcock 306 to disperse a desired pesticide dose. The pentode 310 controls the operation of the air cylinder 314 through the pesticide doses regulator 324 and the air received from the air inlet 312. In some embodiments, the air received in the air inlet 312 is between 1.5 and two bars. The laser 330 is used to mark appropriate target or locations for the pesticide to go.

The pneumatic sprayer as described can be used for pollination and pesticide spraying of palm trees. This sprayer develops high pressure of up to 10 bar, sprays viscous pesticide (mini-gel), and is operated by a 100 W PV system. Using high pressure above the surface of the pesticide in the outlet tank discharges the pesticide from the tank with simple pressure modification. The compressor and electronic control panel compensate and maintain the required pressure. Adjusting the pressure above the pesticide controls the pesticide/pollination longitudinal traveling distance. A red LASER beam is used to locate the position on the tree to drop successive doses of viscous pesticide or pollination. The machine is simple, lightweight, energy-saving, low maintenance, and gives specific doses of pesticide/pollination without waste. It can spray specific doses of viscous pesticide and pollination fluids towards palm trees from a long distance. Two air pressure systems are used, up to 10 bar for discharging the pesticide, and 2 bar for operating a viscous gun with specific doses that are oriented to the target using a LASER.

The pneumatic sprayer can be used by commercial spray operators who use viscous pesticides/liquid on private/public land to control pests and pollination, and also for commercial pollination of palm trees at different heights from standing on the ground. The machine can provide specific viscous pesticide doses and is operate by a PV system, thus reducing environmental pollution to some extent. It can be handled safely, minimizes human health risks, reduces the likelihood of pesticide contamination in the environment, is easy to manufacture, and is useful for operation in remote areas that are away from urban locales, since it doesn't need either electricity or fuel.

It is to be understood that the pneumatic sprayer for palm trees as disclosed herein is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A pneumatic sprayer for palm trees, comprising:
- an air tank having an outlet;
- a one-way air valve having an input port and output port, the outlet of the air tank being connected to the input port of the one-way air valve;
- a compressor connected to the one-way air valve;
- an electronic pressure regulator connected to the air tank, the pressure regulator regulating pressure of air coming from the outlet of the air tank;
- an outlet tank connected to the output port of the one-way air valve, wherein the outlet tank further comprises a stirring system and a first timer to control a stirring time to prevent pesticide sedimentation and wherein said first timer delays a start of the stirring system for a specific amount of time after the compressor starts to work;
- a sprayer connected to the outlet tank;
- a laser connected to the sprayer, the laser marking a target on a palm tree;
- a PV panel supplying power to operate the pneumatic sprayer; and
- a control panel for operating the pneumatic sprayer under automatic or manual control,
- wherein the PV panel supplying power to operate the pneumatic sprayer is controlled by a second timer.

2. The pneumatic sprayer as recited in claim 1, wherein the compressor is a DC air compressor.

3. The pneumatic sprayer as recited in claim 1, wherein the pressure regulator is a digital pressure regulator.

4. The pneumatic sprayer as recited in claim 1, wherein the pressure regulator is adjustable up to a pressure of 10 bar.

5. The pneumatic sprayer as recited in claim 4, further comprising a spray gun mechanical pressure regulator adjustable up to a pressure of 2 bar.

6. The pneumatic sprayer as recited in claim 1, wherein the stirring system comprises a shaft extending into the outlet tank, blades extending from the shaft within the outlet tank, and a motor driving the shaft.

7. The pneumatic sprayer as recited in claim 1, wherein the sprayer is a spray gun having a controller for adjusting pressure of discharges or doses from the spray gun.

8. A system for spraying pesticides and pollination fluids, comprising:
- a trolley;
- an air tank mounted on the trolley, the air tank having an outlet;
- a one-way air valve having an input port and output port, the outlet of the air tank being connected to the input port of the one-way air valve;
- a compressor connected to the one-way air valve;
- an electronic pressure regulator connected to the air tank, the pressure regulator regulating pressure of air coming from the outlet of the air tank;
- an outlet tank mounted on the trolley, the outlet tank being connected to the output port of the one-way air valve, the outlet tank having a bottom and an outlet valve on the bottom of the tank to ensure draining all pesticide from the outlet tank, wherein the outlet tank further comprises a stirring system and a first timer to control a stirring time to prevent pesticide sedimentation and wherein said first timer delays a start of the stirring system for a specific amount of time after the compressor starts to work;
- a sprayer connected to the outlet tank;
- a laser connected to the sprayer, the laser marking a target on a palm tree;
- a PV panel supplying power to operate the system; and
- a control panel for operating the pneumatic sprayer under automatic or manual control,
- wherein the PV panel supplying power to operate the system is controlled by a second timer.

9. The system for spraying as recited in claim 8, wherein the PV panel is a 100W PV panel.

10. The system for spraying as recited in claim 8, wherein the compressor is a DC air compressor.

11. The system for spraying as recited in claim 8, wherein the pressure regulator is adjustable up to a pressure of 10 bar, the system being capable of spraying a viscous pesticide in specific, intermittent, and discontinuous doses.

12. The system for spraying as recited in claim 11, further comprising a spray gun having a spray gun pressure regulator adjustable up to a pressure of 2 bar.

13. The system for spraying as recited in claim 8, wherein the outlet tank further comprises a stirring system.

14. The system for spraying as recited in claim 13, wherein the stirring system comprises a shaft extending into the outlet tank, blades extending from the shaft within the outlet tank, a motor driving the shaft, and an electronic timer to control stirring time to prevent pesticide sedimentation.

15. A method for spraying pesticides and pollination fluids, comprising:
- setting a pressure for a sprayer through a pressure regulator and a compressor connected to a one-way air valve, air from an air tank being supplied to an outlet tank through the one-way air valve;
- using, at the outlet tank, a stirring system and a first timer to control a stirring time to prevent pesticide sedimentation and wherein said first timer delays a start of the stirring system for a specific amount of time after the compressor starts to work;
- using a PV panel to supply power to operate the sprayer where the supplied power is controlled by a second timer;
- aiming the sprayer connected to the outlet tank containing a substance to be dispersed from the spray device;
- marking a target on a palm tree using a laser connected to the sprayer; and
- dispersing the substance at the target through the sprayer.

16. The method for spraying as recited in claim 15, wherein the compressor is a DC compressor.

17. The method for spraying as recited in claim 15, wherein the pressure regulator is adjustable up to a pressure of 10 bar.

18. The method for spraying as recited in claim 15, further comprising a spray gun having a spray gun pressure regulator adjustable up to a pressure of 2 bar.

* * * * *